June 17, 1969  J. E. EDGELL  3,450,367
TAPE RULE PUSHBUTTON LOCK
Filed Dec. 8, 1967
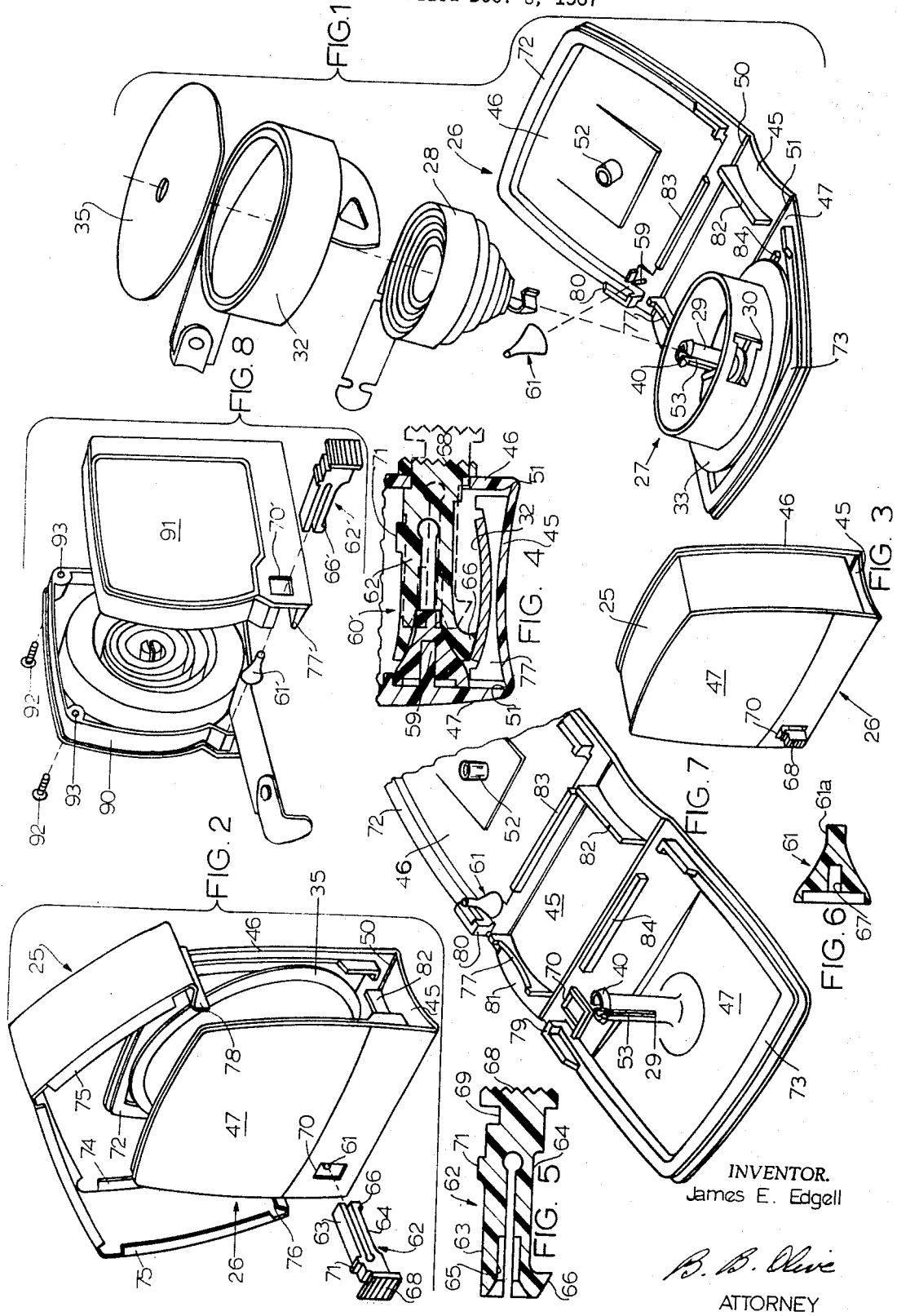
INVENTOR.
James E. Edgell
B. B. Olive
ATTORNEY

United States Patent Office 3,450,367
Patented June 17, 1969

3,450,367
TAPE RULE PUSHBUTTON LOCK
James E. Edgell, Wexford, Pa., assignor to H. K. Porter Company, Inc., Pittsburgh, Pa., a corporation of Delaware
Filed Dec. 8, 1967, Ser. No. 689,167
Int. Cl. B65h 25/48; G01b 3/10, 3/02
U.S. Cl. 242—107.2           6 Claims

ABSTRACT OF THE DISCLOSURE

A pushbutton operated tape rule lock incorporates a clothespin like member which spreads when pushed inwardly against a fixed inner wedge member causing one leaf of the clothespin member to deflect against and lock the tape. The lock adapts both to rigid and flexible wall tape rule housings.

Cross reference to related applications

The present invention constitutes an improvement over and relates to and may be employed in conjunction with tape rules of the type disclosed in copending application Ser. No. 602,790, filed Dec. 19, 1966. The present and subject copending application are related in that each of the inventions disclosed therein teaches employement of manually operable, resilient and deformable braking members for locking or braking the tape portion of a coilable tape rule in a given position.

Background of invention

*Field of invention.*—This invention pertains to means for locking or braking the tape portion of a coilable tape rule in selected withdrawn positions. Such devices are sometimes classified as reels with brakes and at other times as a tape reel feature.

*Description of the prior art.*—Patent 3,114,515 represents a class of such patents in which the tape is releasably braked; that is, the tape is subjected to frictional braking sufficient to overcome the spring tension but in an amount substantially less than required to positively lock the tape. In contrast, see Patent 3,214,836 as representing a somewhat different class of patents more in the nature of positive locking devices; that is, devices which will effectively lock the tape in a given position so that it will not move axially except when strongly forced in an axial direction. The present invention is in the nature of a positive locking device though related to both classes.

Referring again to Patent 3,114,515, this patent also represents a type of brake which can be applied in graduated amounts so that if the rule is extended, say, its full length and the operator wants it extended to half its length, the operator can release the brake and then gradually restore and release the braking action as required to bring the rule to a half-withdrawn position. Stated differently, the type of brake construction embodied in Patent 3,114,515 does not necessarily need to be fully applied or fully released but can be employed in a slipping clutch like action. In contrast, the usual positive lock device does not lend itself to this type of operation. However, positive locking and clutch type braking are both desirable features in the same rule.

Another characteristic which can be observed in various conventional braking and locking devices is the employment of resilient members which usually take the form of metallic coil or leaf springs which are employed to regulate the braking action and for the purpose of restoring the brake to a release position. In any event, the conventional practice requires a multiplicity of parts to provide a convenient thumb or finger actuated brake or lock press member as well as a member or members to accomplish the actual braking or locking action.

In the referred to copending applications, there is taught an improved releasable type braking construction which is obtained by forming the housing with resilient and deformable side walls and using braking plates which depend for position on the wall positions. When the side walls are squeezed together the braking action of the plates is released and when free of manual pressure the side walls assume a position which causes a braking action to be applied by the plates. The construction taught by the co-pending applications eliminates the need for the usual metal leaf or coil braking springs and provides a smooth clutch like releasable braking action which is desirable and satisfactory for most tape positioning requirements. Also, in the referred to copending application there is a second braking or locking means employed wherein a pushbutton member deforms internally of the tape housing when pushed inwardly so as to engage and positively lock the tape in its then position. Squeezing of the housing walls or manipulation of the pushbutton member causes the member to be released and the inherent resiliency of the member restores it to a non-locking position.

An advantage of the positive and clutch type braking structures taught by the copending application is that they lend themselves to being molded and formed with a minimum of parts. While the positive lock taught by the copending application represents a substantial improvement over the prior art it has been found that employment of a flexible web as the locking member requires substantial force to overcome the column strength of the web and when subjected to repeated operations there is likelihood of experiencing fractures in the center of the web. The positive lock of the copending application nevertheless has many advantages such as being adapted to either flexible or rigid wall housings and to being formed as a molded unit.

Summary of the invention

The present invention provides a positive locking device for tape rules and is particularly adapted to the type rule having a flexible wall housing and clutch type braking actuated by such flexible walls. More particularly the present invention utilizes a cone shaped or wedge member located internally of the housing and a clothespin shaped member which when pushed inwardly against the cone member has its lower leaf deflected and wedged against the tape as a positive lock. The clothespin member has a notch which allows it to be locked in its innermost locking position. The lock is released by downward pressure on the portion of the clothespin member extending outside the rule. In one embodiment the cone is molded as part of the housing wall and in another embodiment constitutes a separate molded piece. Either embodiment is adapted to flexible wall or rigid wall tape rule housings.

An object of the invention is to provide an improved positive tape rule lock which requires a minimum of inward locking pressure and reduces the opportunity for flexure fracture in repeated use.

Another object is to provide a positive tape lock that is particularly compatible in manufacture and operation with those tape rules having a flexible wall housing and a clutch type brake operated by flexing the walls of such housing.

The foregoing and other objects will appear from the description to follow.

Drawing description

FIGURE 1 is an exploded perspective view of a tape rule embodying the invention;

FIGURE 2 is an exploded perspective view of the tape rule of FIGURE 1 showing a clip about to enclose the rule case and a lock button about to be positioned within the case;

FIGURE 3 is a perspective view of the assembled tape rule;

FIGURE 4 is a fragmentary section view of the locking mechanism in a locked position and in dashed lines an unlocked position;

FIGURE 5 is a section view of the lock button;

FIGURE 6 is a section view of the wedge member;

FIGURE 7 is a fragmentary perspective view of the sidecase and showing the portion thereof hidden in FIGURE 1; and FIGURE 8 is an exploded perspective view of a rigid wall rule constituting an alternate embodiment.

Detailed description

The rule housing as conventionally known is made up in the present invention from an assembly of a clip 25 to a sidecase 26. Sidecase 26 includes a bottom wall 45, a left side wall 46 and a right side wall 47. Sidecase 26 is preferably formed of a resilient deformable material in the nature of a plastic such as polypropylene or polyethylene which enables walls 45, 46 and 47 to be molded as an integral piece. By utilizing relatively thin lines of juncture, as indicated at 50, 51, the bottom wall 45 is effectively hinged to side walls 46 and 47. A flanged drum 27 is mounted on a post 29 which post is formed integral with sidecase 26 and includes a slot 53. A recoil spring 28, which may be of the usual construction, is mounted on post 29 in engagement with slot 53 and resides within drum 27. Drum 27 has a slot 30 which receives spring 28 and a conventional tape 32 is coiled around drum 27 with one edge resting against the drum flange 33. A pressure plate 35, whose purpose is later explained, is mounted on post 29 opposite flange 33.

The previously referred to post 29 mounts centrally of right side wall 47 and is hollow so as to receive a mating stud 52. Stud 52 forms an integral part of left side wall 46 and serves the purposes of aligning the two case halves during assembly and preventing the outer end of post 29 from collapsing after assembly. Enlargement 40 on post 29 holds the parts in working relation and in particular acts to retain drum 27 and pressure plate 35 in assembly and to limit their travel on post 29. At this point in the description, it should be noted that so far as the releasable brake portion of the invention is concerned, such braking function is achieved primarily by the interaction of the side walls 46, 47, the flange 33 and the pressure plate 35. This action is referred to later and the description next turns to the mechanism involved in providing a positive lock for the tape as compared to a releasable brake. Furthermore, it should be understood that the aforesaid flexible wall structure forms no part of the present invention, per se, except as the same is combined with the present invention.

Tape lock mechanism 60, constituting the present invention, includes a wedge member 61 which at one end has a recess 67 adapted to receive a pin 59 which in turn extends from and is integral with left side wall 46. A clothespin type lockbutton 62 slidably mounts on shaft portion 61a (FIGURE 6) of wedge 61. Lockbutton 62 further includes an intermediate section which comprises a pair of thin resilient, deformable leaves 63, 64 which in turn forms a slot 65 for the wedge shaft 61a.

In operation, lockbutton 62 works against wedge 61 and deflects leaf 64 downward so as to cause shoe portion 66 of leaf 64 to contact the tape 32. Tape 32 is effectively trapped or wedged between tape guide 77, molded integral with bottom wall 45, and shoe portion 66 of leaf 64. In connection with choice of materials, it is particularly desirable that leaf 64 be resilient yet sufficiently rigid when bent to firmly force shoe 66 against tape 32 and in turn force tape 32 against tape guide 77. Wedge 61 and lockbutton 62 are therefore preferably molded from materials having a low coefficient of friction such as "Zytel 101," a nylon type plastic made by E. I. du Pont and Company of Wilmington, Del.

The outer end of lockbutton 62 terminates in the form of a pushbutton knob 68. Lockbutton 62 also includes a notch 69 which can be brought into engagement with the edge of a hole 70 located in side wall 47 and which slidably receives the exposed end of lockbutton 62. As may be noted particularly in FIGURE 4, when knob 68 is pushed inwardly leaves 63 and 64 flex and leaf 64 in turn forces shoe 66 against the upper surface of tape 32 with sufficient force to wedge tape 32 against the tape guide 77 which provides a bottom wall locking surface. Notch 69 may, of course, be engaged with hole 70 so as to retain lockbutton 62 in the locked position. Thus, at any extended position of tape 32, knob 68 may be pressed inwardly until the notch 69 locks and in such position leaf 64 will tend to effectively, rigidly lock tape 32 in position. Lockbutton 62 and its positive locking action can be released by pressing lockbutton 62 downwardly so as to disengage notch 69 from hole 70. The releasable clutch type brake provided by flange 33 and plate 35 however is maintained and is released only by pressing of walls 46, 47.

Another aspect of the invention of particular interest is that due to the fact that lockbutton 62 is made with an inherent resiliency and leaves 63, 64 are acting on sloping surfaces, once lockbutton 62 is disengaged from its locked position the inherent resiliency and axial reaction tends to move lockbutton 62 into a non-locking position wherein an offset 71 provides a positive stop against the inside of hole 70.

In order to better understand the cooperation of the positive locking action of the present invention with the releasable braking action provided by side walls 46, 47, flange 33 and plate 35, it may be noted that the tape 32 is normally squeezed between plate 35 and flange 33 and such pressures can be released by pressing or squeezing on the walls 46, 47. Walls 46, 47 are formed so that they bulge outwardly and due to the nature of the plastic material employed, they each have a natural spring action very much like the action of the bottom of an oil can. The length of post 29 is designed so that flange 33 and pressure plate 35 are normally forced toward each other so as to assert a releasable friction against the outer edges of tape 32. When walls 46, 47 are squeezed together, this friction force is released and drum 27 and pressure plate 35 are given some play or freedom to move on post 29. Stated differently, the "working length" of post 29 is increased whenever the walls of sidecase 26 are squeezed together and thus the braking action is controlled simply by squeezing and releasing side walls 46, 47 of sidecase 26. From this it can be seen that the operator can disengage the positive lock without affecting the releasable brake.

For assembly, wedge 61 is mounted on pin 59. The left side wall 46 of sidecase 26 is provided with an inverted U-shaped rib 72 and the right side wall 47 is provided with a similar rib 73. It will also be noticed that clip 25 is provided with inverted U-shaped lips 74 and 75, the latter being designed to engage the respective ribs 72, 73 so as to provide a means for holding the side walls 46, 47 in their respective positions. That is, when clip 25 is assembled to sidecase 26, the ribs 72, 73 are brought into locking engagement with the respective lips 74, 75. Clip 25 will also be noted as having a front clip section 76 and a rear clip section 78. In final assembly the front clip section 76 is secured under the bottom and lower portions of the front vertical runs of ribs 72, 73 so as to engage the rib portions indicated at 79, 80. Rear clip section 78 is secured in a similar manner.

After the pressure plate 35 has been snapped over the enlarged end of post 29 and the tape lock mechanism 60 has been assembled on pin 59, the sidecase 26 is folded into a U-shape so that stud 52 on wall 46 is aligned with and forced into the hole in post 29. As previously mentioned, the diameter of stud 52 is such that it prevents post 29 from collapsing once stud 52 has been installed in post 29 and the enlarged portions 40 of post 29 is forced outwardly so as to retain drum 27, spring 28 and plate 35 on post 29. After the sidecase 26 has been folded and stud 52 installed as described and with the offset portion 71 of lockbutton 62 resting against the inside of hole 70, clip 25 is fitted with its lips 74, 75 and front and rear clip sections 76, 78 engaging ribs 72, 73 as previously discussed in such manner as to keep the whole assembly locked together and to provide a slot for the tape 32 as indicated at 81. Tape guide 77 against which tape 32 is pressed when locked reduces rattle due to vibration of the tape 32 against the tape slot 81 once the braking force is released. Also integral with bottom wall 45 in its interior opposite tape guide 77 is an end closure 82 which helps define the travel of tape 32. Both tape guide 77 and end closure 82 furthermore act to stiffen and preserve the concave bottom wall 45. Another pair of stiffner members 83, 84 are made integral with the respective side walls 46, 47 and extend parallel to the "living hinges" formed at 50, 51. It is recognized that wedge 61 in FIGURE 7 can be considered as being molded as an integral part of wall 46 and thereby eliminating pin 59 or as a removable part as illustrated in FIGURE 1.

Referring now to FIGURE 8, an alternate embodiment is illustrated. A metal rule case having two side sections 90, 91 is shown. The tape and spring are inserted in the usual manner and in this embodiment wedge 61' is mounted on a pin 59' (not shown) which is integral with side section 90. Lockbutton 62' is then passed through hole 70' in side section 91 and mounts on wedge 61' as described in the first embodiment. Screws 92 extend through threaded holes 93 and into side section 91 and close rule case. In this embodiment, the entire braking action is carried out by the lockbutton 62 and wedge 61. As in the first embodiment shoe portion 66' of lockbutton 62' forces the tape into contact with tape guide or entrance lip 77'.

In summary, the present invention by reason of the described lockbutton and wedge structure aids and makes easier and more convenient the transferring of measurements and gives the needed protection against accidental movement of the tape into the case once it has been set at some desired position. More specifically, the required positive locking force has been reduced and the risk of flexure damage has been substantially reduced in comparison with the prior structures previously referred to. Furthermore, the present invention retains the advantage of using inherent resiliency to return the positive lock so as to eliminate any requirements for return springs and the like.

While preferred embodiments have been shown and described, various modifications will appear to those skilled in the art. Therefore, the following claims are expected to be construed within the spirit and scope of the invention.

What is claimed is:

1. In a flexible tape rule having a case with bottom, top, front, rear and side walls and including a tape slot between the front and bottom walls, a post fixedly mounted within the case, a recoil spring mounted on the post and a measuring tape connected to the spring and extending through the slot:

(a) an elongated press button locking member positioned adjacent said slot and extending above and across said tape and having integral oppositely extending leaf and body portions, said leaf portion being located within said case and having a pair of vertically spaced upper and lower resilient leaves forming a slot therebetween extending axially of said member, said body portion mounting said leaves and extending through and slidably engaging a first one of said side walls and providing a thumb press surface external of said case; and
   (b) a wedge member fixedly mounted on the second one of said side walls and axially aligned with said slot, said wedge member including a first pin portion adapted to enter said slot and thereby guide inward and outward axial travel of said locking member and a second integral wedging portion providing angular surfaces engaged by the ends of said leaves, the inherent resiliency and friction of said leaves and the slope and friction of said surfaces being selected such that upon pressing upon said press surface and forcing said locking member inwardly the ends of said leaves spread while engaging said surfaces whereby to bring the lower of said leaves in resilient engagement with said tape to positively lock said tape against said bottom wall and upon release of said inward forcing being adapted to inherently cause said locking member to be forced outwardly to a nonlocking position.

2. In a tape rule as claimed in claim 1 wherein said wedge member is pin mounted on said second side wall.

3. In a tape rule as claimed in claim 1 wherein wedge member is formed integral with said second side wall.

4. In a tape rule as claimed in claim 1 wherein said case comprises a completely rigid structure.

5. In a tape rule as claimed in claim 1 wherein at least said side walls are resilient and including plate braking means normally engaging and braking an edge of said tape and being releasable upon inward pressing of said side walls whereby to provide both positive and clutch like braking in said rule.

6. In a tape rule as claimed in claim 1 wherein said locking member body portion is formed internally of said case with means to limit the outward travel thereof and externally of the case with means enabling said body portion when in an inward locking position to be releasably locked to said first side wall.

References Cited

UNITED STATES PATENTS

| 2,132,202 | 10/1938 | Carlson | 242—84.8 X |
| 2,599,320 | 6/1952 | Dart | 242—107.3 |
| 2,680,576 | 6/1954 | Nykwest et al. | 242—84.8 |

WILLIAM S. BURDEN, *Primary Examiner.*

U.S. Cl. X.R.

33—138; 242—84.8